US012276397B1

(12) United States Patent
Xu et al.

(10) Patent No.: US 12,276,397 B1
(45) Date of Patent: Apr. 15, 2025

(54) LED LAMP WITH ANGLE CONTROLLER

(71) Applicant: SHENZHEN SNC OPTO ELECTRONIC CO., LTD., Guangdong (CN)

(72) Inventors: Jianyong Xu, Guangdong (CN); Renhui Liang, Guangdong (CN)

(73) Assignee: SHENZHEN SNC OPTO ELECTRONIC CO., LTD., Shenzhen (CN)

( * ) Notice: Subject to any disclaimer, the term of this patent is extended or adjusted under 35 U.S.C. 154(b) by 0 days.

(21) Appl. No.: 18/789,868

(22) Filed: Jul. 31, 2024

(30) Foreign Application Priority Data

May 21, 2024 (CN) ........................ 202410626997.5

(51) Int. Cl.

| | |
|---|---|
| ***F21S 8/06*** | (2006.01) |
| ***F21V 5/00*** | (2018.01) |
| ***F21V 14/02*** | (2006.01) |
| ***F21V 23/00*** | (2015.01) |
| ***F21V 23/04*** | (2006.01) |
| *F21Y 105/18* | (2016.01) |
| *F21Y 115/10* | (2016.01) |

(52) U.S. Cl.
CPC ................ *F21S 8/06* (2013.01); *F21V 5/007* (2013.01); *F21V 14/02* (2013.01); *F21V 23/008* (2013.01); *F21V 23/04* (2013.01); *F21Y 2105/18* (2016.08); *F21Y 2115/10* (2016.08)

(58) Field of Classification Search
CPC ............. F21V 5/007; F21V 14/02; F21S 8/06
See application file for complete search history.

(56) References Cited

U.S. PATENT DOCUMENTS

| | | | | |
|---|---|---|---|---|
| 6,657,393 | B2 * | 12/2003 | Natsume | B60Q 1/44 315/83 |
| 10,267,486 | B1 * | 4/2019 | Mao | F21V 33/0052 |
| 10,966,303 | B2 * | 3/2021 | Harvey | F21V 14/003 |
| 11,913,614 | B2 * | 2/2024 | Monsonego | F21V 3/049 |
| 2003/0053310 | A1 * | 3/2003 | Sommers | F21V 19/001 362/249.05 |
| 2007/0030675 | A1 * | 2/2007 | Oon | H04N 23/56 257/E33.071 |
| 2017/0234520 | A1 * | 8/2017 | Yu | F21V 5/04 362/294 |
| 2018/0116023 | A1 * | 4/2018 | Schmidt | F21V 23/04 |
| 2018/0209636 | A1 * | 7/2018 | Sohn | F21V 21/30 |
| 2018/0306412 | A1 * | 10/2018 | Halliwell | F21S 8/026 |
| 2020/0332981 | A1 * | 10/2020 | Shima | F21V 7/0083 |

* cited by examiner

*Primary Examiner* — Tracie Y Green
*Assistant Examiner* — Michael Chiang

(57) ABSTRACT

An LED lamp includes a lamp holder provided with a mounting groove; an LED lamp panel mounted in the mounting groove and including a plurality of groups of light-emitting elements uniformly arranged in a plurality of sectors; a driving power supply mounted to the lamp holder and configured to supply power to the LED lamp panel; a light-transmitting plate fixed to the lamp holder and covering the LED lamp panel; and an angle controller electrically connected between the LED lamp panel and the driving power supply, the angle controller provided on the lamp holder to control the light-emitting elements corresponding to different positions on the light-transmitting plate to emit light.

7 Claims, 9 Drawing Sheets

LED LAMP WITH ANGLE CONTROLLER

CROSS-REFERENCE

The present application claims priority of Chinese Patent Application No. 2024106269975, filed with the Chinese Patent Office on May 21, 2024, and entitled "LED LAMP", the entire content of which is incorporated herein in its entity

TECHNICAL FIELD

The present disclosure relates to the field of lighting devices, and in particular relates to an LED lamp.

BACKGROUND

LED lamps have many advantages such as energy-saving, environmental protection, long life and so on, and have been widely used in various lighting places. However, the conventional LED lamps have some problems as follows:

1. The conventional LED lamp generally includes a lens plate. However, the position of the lens plate of the existing LED lamp is fixed and cannot be flexibly adjusted according to the requirements of different places of use, so that a light distribution direction of the LED lamp cannot be adjusted.
2. The conventional LED industrial and mining lamp has a single output power, and even if LED is used as a light source, the LED industrial and mining lamp with a single output power has a defect of wasting electric resources in a place with a small lighting area or low lighting brightness requirements.
3. Some LED lamps are equipped with controllers, but a single control mode is provided, which cannot flexibly meet the market demand.

SUMMARY

Accordingly, an LED lamp is provided.

An LED lamp includes a lamp holder provided with a mounting groove; an LED lamp panel mounted in the mounting groove and including a plurality of groups of light-emitting elements uniformly arranged in a plurality of sectors; a driving power supply mounted to the lamp holder and configured to supply power to the LED lamp panel; a light-transmitting plate fixed to the lamp holder and covering the LED lamp panel; and an angle controller electrically connected between the LED lamp panel and the driving power supply, the angle controller provided on the lamp holder to control the light-emitting elements corresponding to different positions on the light-transmitting plate to emit light.

In one of the embodiments, there is a first gap between two adjacent sectors of the light-emitting elements, in each group of light emitting elements, there is a second gap between two adjacent rows of the light-emitting elements, and there is a third gap between two adjacent light-emitting elements in the same row of light-emitting elements.

In one of the embodiments, each group of light-emitting elements includes a first lamp bead, a second lamp bead, a third lamp bead, and a fourth lamp bead that are arranged in a substantially rectangular shape, a spacing between the first lamp bead and the second lamp bead and a spacing between the third lamp bead and the fourth lamp bead are 8 mm to 11 mm, respectively, and a spacing between the first lamp bead and the fourth lamp bead and a spacing between the second lamp bead and the third lamp bead are 7 mm to 9 mm, respectively.

In one of the embodiments, the angle controller includes a switch base, an electronic switch, and a handle, the switch base is fixed in the lamp holder, the electronic switch is fixedly mounted on the switch base and is electrically connected to the driving power supply and the LED lamp panel, the electronic switch has a plurality of states, the handle is connected to the electronic switch and is configured to be toggled to change the state of the electronic switch, and the electronic switch is configured to control whether the first lamp bead, the second lamp bead, the third lamp bead, and the fourth lamp bead to be turned on and emit light according to different states of the electronic switch.

In one of the embodiments, the first lamp bead is turned on and emits light when the electronic switch is in a first state, the first lamp bead and the third lamp bead are turned on and emit light when the electronic switch is in a second state, the third lamp bead is turned on and emits light when the electronic switch is in a third state, the first lamp bead and the second lamp bead are turned on and emit light when the electronic switch is in a fourth state, the first lamp bead, the second lamp bead, the third lamp bead, and the fourth lamp bead are turned on and emit light when the electronic switch is in a fifth state, the third lamp bead and the fourth lamp bead are turned on and emit light when the electronic switch is in a sixth state, the second lamp bead is turned on and emits light when the electronic switch is in a seventh state, the second lamp bead and the fourth lamp bead are turned on and emit light when the electronic switch is in an eighth state, and the fourth lamp bead is turned on and emits light when the electronic switch is in a ninth state.

In one of the embodiments, the light-transmitting plate is provided with a lens structure, the light-transmitting plate includes a lens frame and a plurality of lenses provided on the lens frame, the plurality of lenses are arranged corresponding to the light-emitting elements and protrude in a direction away from the light-emitting elements, and the lens frame is provided with a plurality of through holes corresponding to the plurality of lenses.

In one of the embodiments, the plurality of lenses are uniformly arranged in a plurality of sectors on the lens frame around an axis of the lens frame, in each sector, a plurality of rows of the lenses are provided; in each row of lenses, a plurality of lenses are arranged in an arc; in the same sector, there is a fourth gap between two adjacent rows of lenses, there is a fifth gap between two lenses between two adjacent sectors, a circle formed by the lenses closest to the axis of the lens frame has a minimum radius, and as the lenses are located away from the axis of the lens frame, a radius of a circle formed by the corresponding lenses increases gradually.

In one of the embodiments, each group of light-emitting elements includes a first lamp bead, a second lamp bead, a third lamp bead and a fourth lamp bead that are arranged in a substantially rectangular shape, the lens is provided with grooves corresponding to the second lamp bead and the fourth lamp bead, respectively, or the lens is provided with grooves corresponding to the first lamp bead and the third lamp bead.

In one of the embodiments, the LED lamp further includes a sealing ring provided between the light-transmitting plate and the LED lamp panel.

In one of the embodiments, the LED lamp further includes a hanging ring to the driving power supply, and the hanging ring is configured to be mounted to a ceiling.

BRIEF DESCRIPTION OF THE DRAWINGS

The drawings are for illustrative purposes only and are only schematic drawings, not physical drawings, and shall not be construed as limiting this patent. In order to better explain the embodiment of the utility model, some parts of the drawings may be omitted, enlarged or reduced, which does not represent the size of the actual product. It will be appreciated by those skilled in the art that some of the known structures and their descriptions in the drawings may be omitted.

Figure 1:
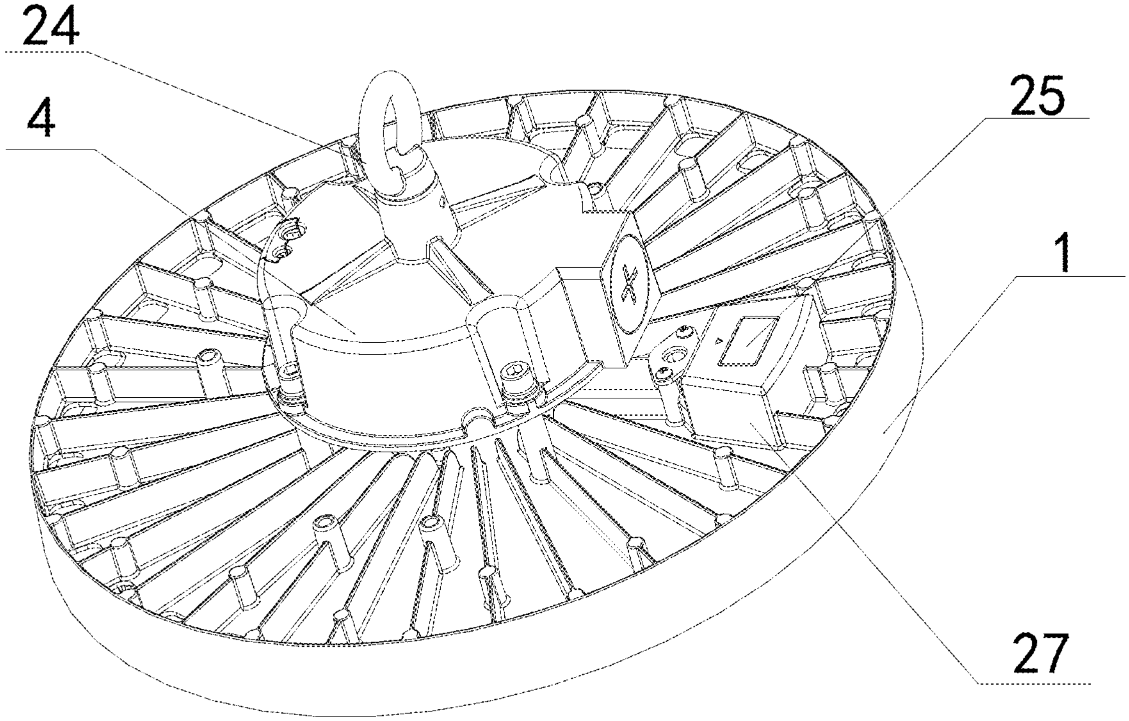
FIG. 1 is a perspective view of an LED lamp according to an embodiment of the present disclosure.
Figure 2:
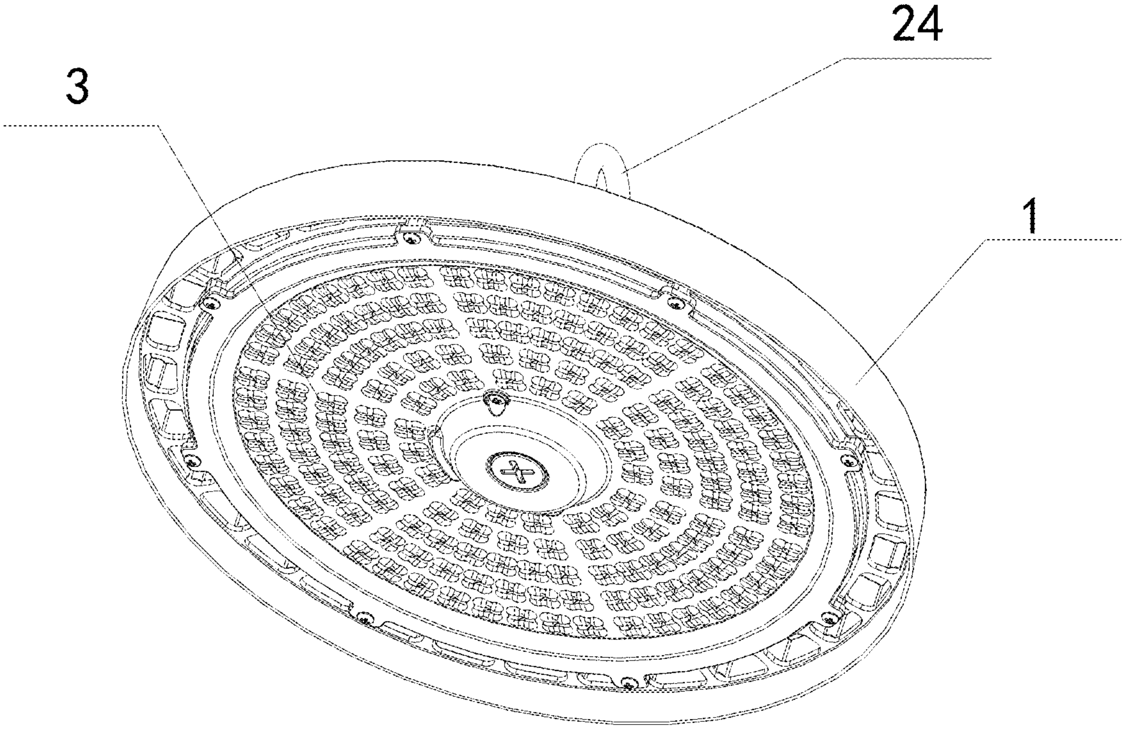
FIG. 2 is another perspective view of the LED lamp show in FIG. 1.

1. Lamp holder; 2. LED lamp panel; 3. Light-transmitting plate; 4. Driving power supply; 5. Mounting groove; 6. Light-emitting element; 7. Angle controller; 8. Switch base; 9. Electronic switch; 10. Handle; 11. First lamp bead; 12. Second lamp bead; 13. Third lamp bead; 14. Fourth lamp bead; 15. First gap; 16. Second gap; 17. Third gap; 18. Lens frame; 19. Lens; 20. Through hole; 21. Fourth gap; 22. Fifth gap; 23. Groove; 24. Hanging ring; 25. Rubber plug; 26. Rubber sleeve; 27. Fixing groove; 28. Seal ring; 29. First lens portion; 30. Second lens portion; 31. Third lens portion; 32. Fourth lens portion.

DETAILED DESCRIPTION OF THE EMBODIMENTS

The technical solution in the embodiment of the present application will be clearly and completely described below in conjunction with the drawings in the embodiment of the application. Apparently, the described embodiments are only some of the embodiments of the application, not all of them. Based on the embodiments in the present application, all other embodiments obtained by a person skilled in the art without making creative efforts shall all fall within the protection scope of the present application.

In the drawings of the embodiments of the present disclosure, the same or similar numbers correspond to the same or similar components. In the description of the present disclosure, it should be understood that terms "upper", "lower", "front" and "rear", "left", "right", "vertical", "horizontal", "lateral", "longitudinal", "top", "bottom", "inner", "outer", and other indicated orientation or positional relationships are based on the orientation or positional relationship shown in the drawings for convenience and simplicity of description of the present disclosure only, and not as an indication or implication that the devices or elements referred to must have or be constructed or operated in a specific orientation. Therefore, the terms describing positional relationships in the drawings are only for illustrative purposes and should not be construed as limitations of the present disclosure.

Referring to an embodiment of the present disclosure shown in FIGS. 1 to 13, an LED lamp includes a lamp holder 1, an LED lamp panel 2, a light-transmitting plate 3, and a driving power supply 4. The lamp holder 1 may have a heat dissipation function. The driving power supply 4 is mounted to the lamp holder 1 and configured to supply power to the LED lamp panel 2. The lamp holder 1 is provided with a mounting groove 5. The LED lamp panel 2 is mounted in the mounting groove 5. The LED lamp panel 2 includes a plurality of groups of light-emitting elements 6. The light-transmitting plate 3 is fixed to the lamp holder 1 and covers the LED lamp panel 2. Light emitted by the light-emitting elements 6 is transmitted to an external environment through the light-transmitting plate 3. The LED lamp further includes an angle controller 7 electrically connected between the LED lamp panel 2 and the driving power supply 4. The angle controller 7 is provided on the lamp holder 1 to control the light-emitting elements 6 corresponding to different positions on the light-transmitting plate 3 to emit light.

By providing the angle controller 7, when the light angle, color temperature and power of the LED lamp need to be adjusted, only the angle controller 7 needs to be operated to control the light-emitting elements 6 corresponding to different positions on the light-transmitting plate 3 to emit light.

Figure 7:
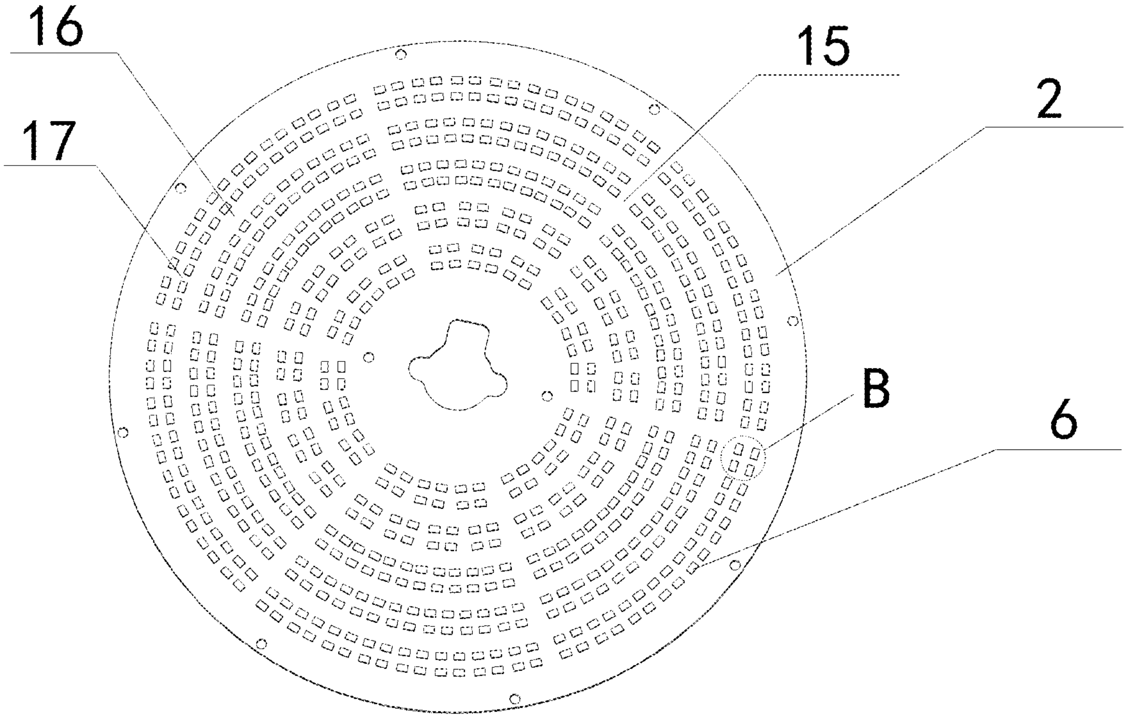
FIG. 7 is a front view of a LED lamp panel in FIG. 3.
Figure 8:
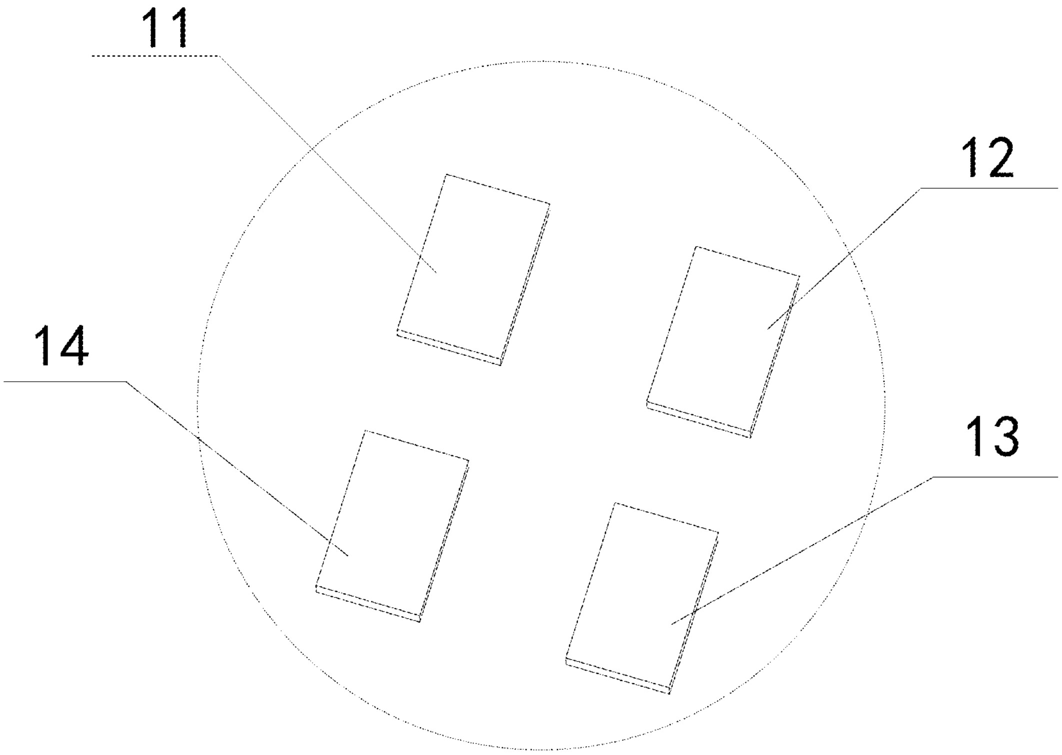
FIG. 8 is an enlarged view of portion B of FIG. 7.
Figure 9:
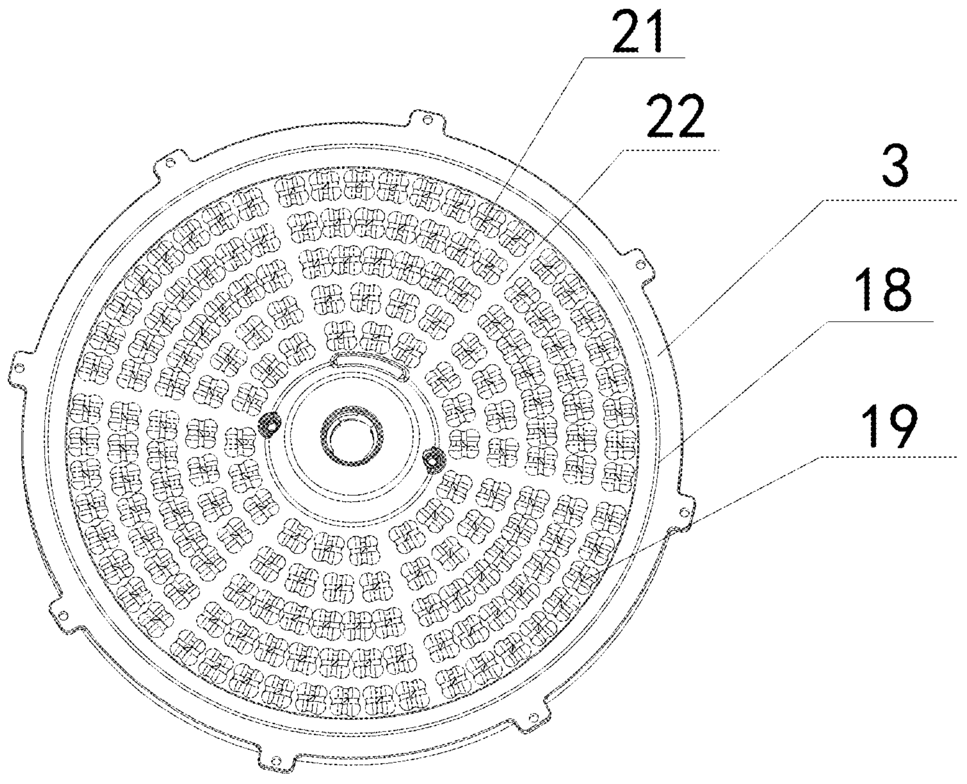
FIG. 9 is a front view of a light-transmitting in FIG. 3 fixed to a lamp holder.
Figure 10:
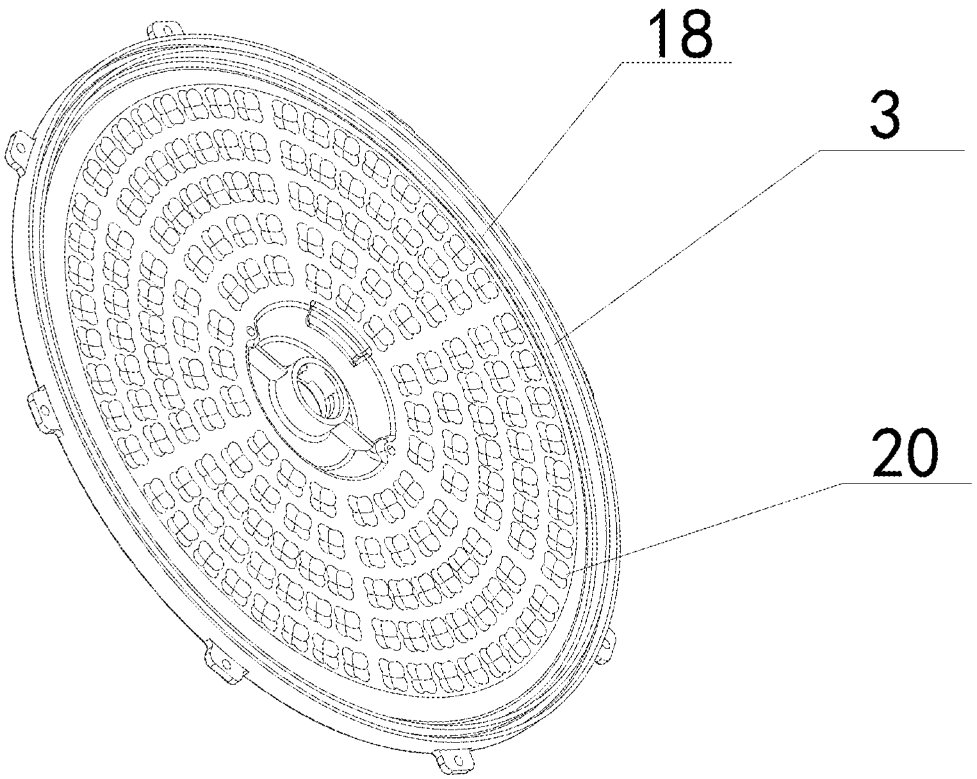
FIG. 10 is a perspective view of the light transmissive plate of FIG. 3 fixed to the lamp holder.
Figure 11:
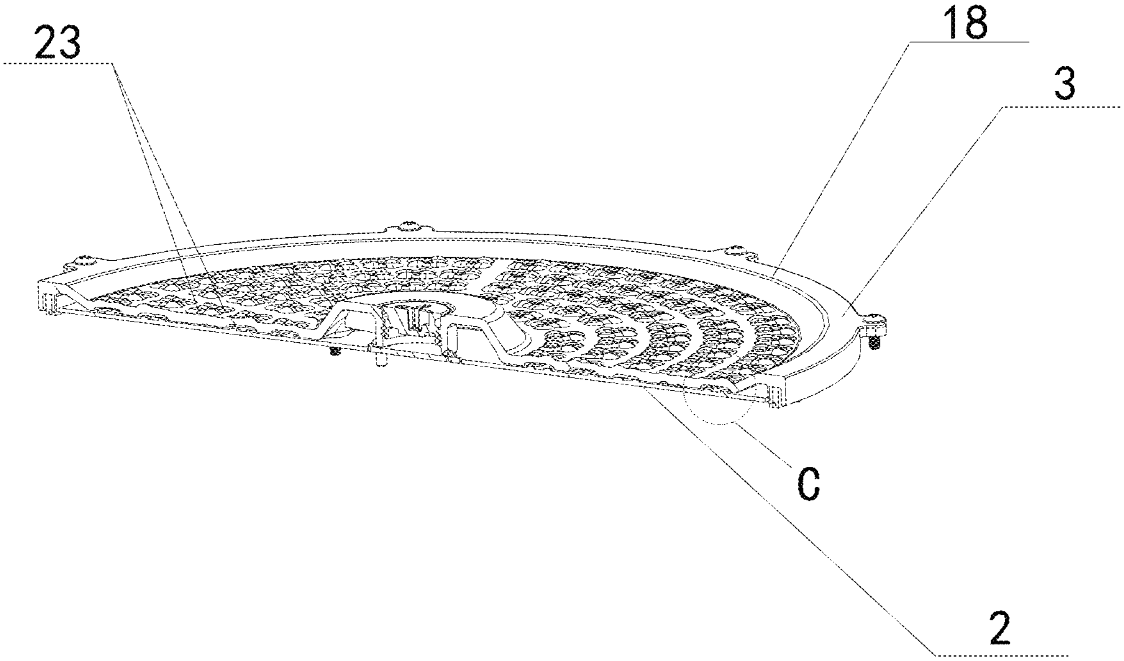
FIG. 11 is a perspective sectional view of the light-transmitting plate of FIG. 10.
Figure 12:
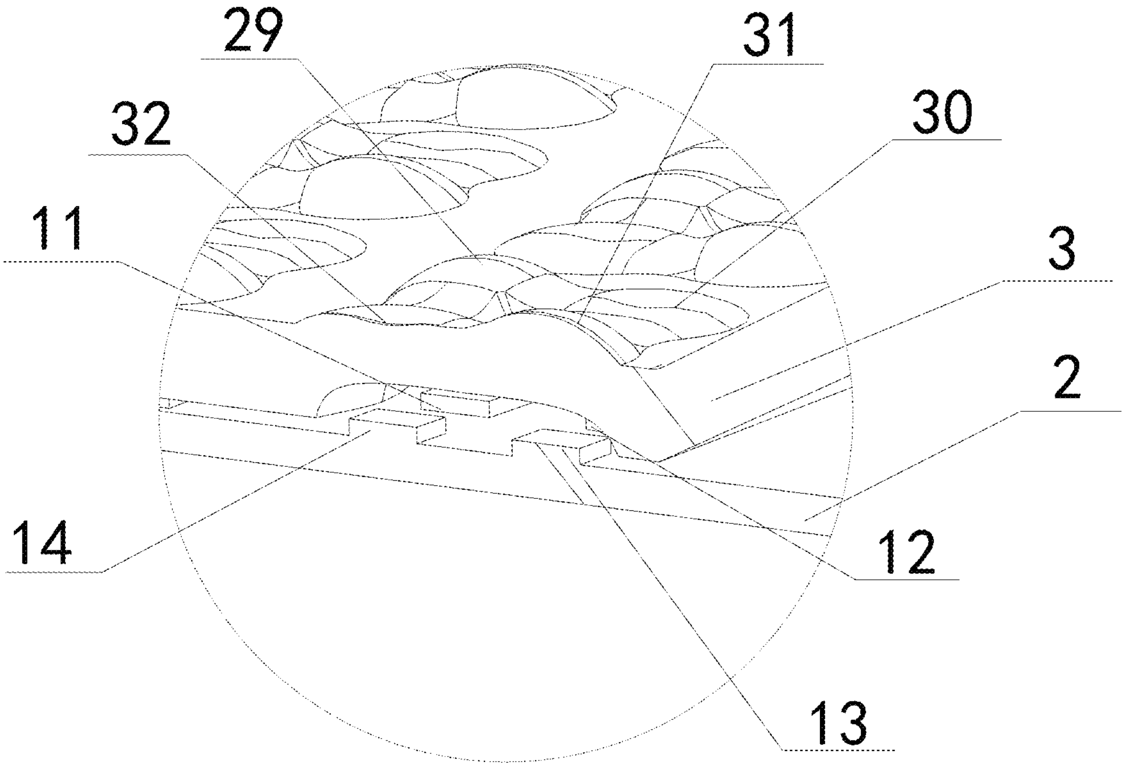
FIG. 12 is an enlarged view of portion C of FIG. 11.

As shown in FIGS. 7 to 8, the plurality of groups of the light-emitting elements 6 are uniformly arranged on the LED lamp panel 2 in a plurality of sectors. There is a first gap 15 between two adjacent groups of the light-emitting elements 6. In each group of light emitting elements 6, there is a second gap 16 between two adjacent rows of the light-emitting elements 6, and there is a third gap 17 between two adjacent light-emitting elements 6 in the same row of light-emitting elements 6.

Each group of light-emitting elements 6 includes a first lamp bead 11, a second lamp bead 12, a third lamp bead 13, and a fourth lamp bead 14 that are arranged in a substantially rectangular shape. A spacing between the first lamp bead 11 and the second lamp bead 12 and a spacing between the third lamp bead 13 and the fourth lamp bead 14 are 8 mm to 11 mm, respectively, such as 10 mm, to achieve a good light-emitting effect. A spacing between the first lamp bead 11 and the fourth lamp bead 14 and a spacing between the second lamp bead 12 and the third lamp bead 13 are 7 mm to 9 mm, respectively, such as 8.2 mm, to achieve a good light-emitting effect.

Color temperature values of the light emitted from the first lamp bead 11 and the second lamp bead 12 may be 3000 K. Color temperature values of the light emitted from the third lamp bead 13 and the fourth lamp bead 14 may be 5000 K.

Figure 4:
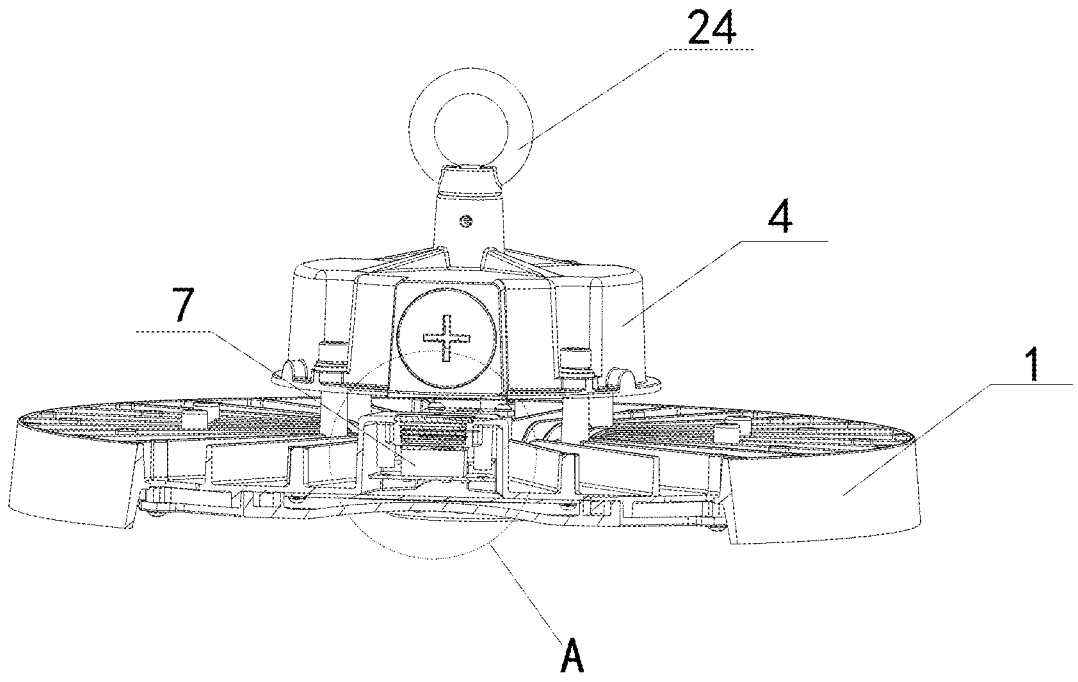
FIG. 4 is a perspective sectional view of the LED lamp of FIG. 1.
Figure 5:
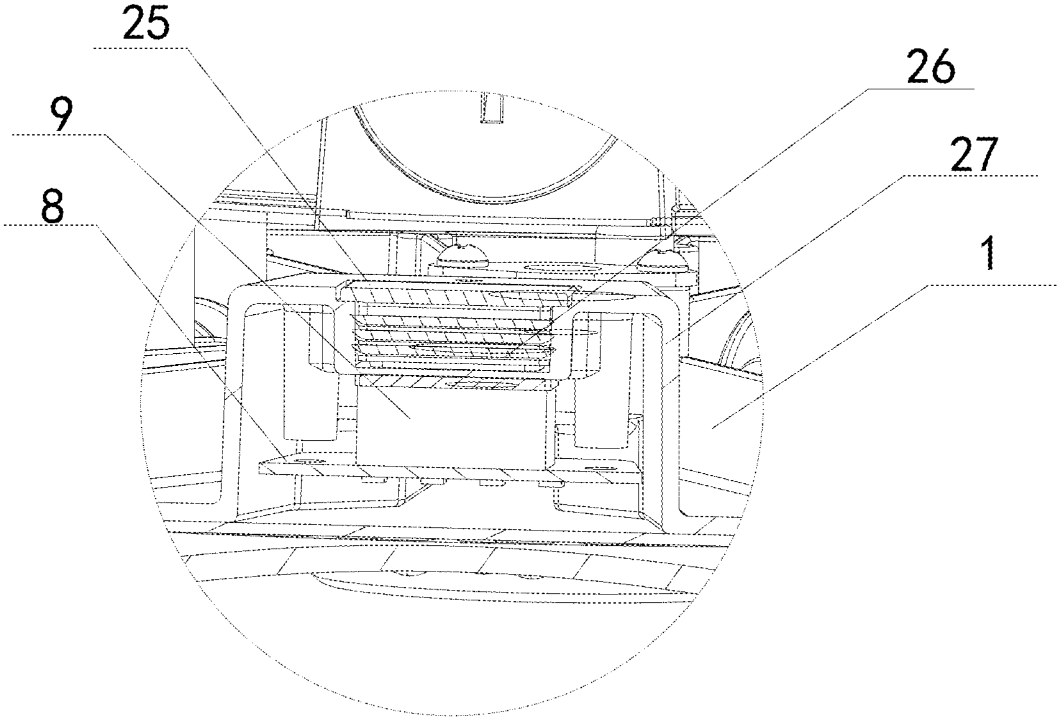
FIG. 5 is an enlarged view of portion A of FIG. 4.
Figure 6:
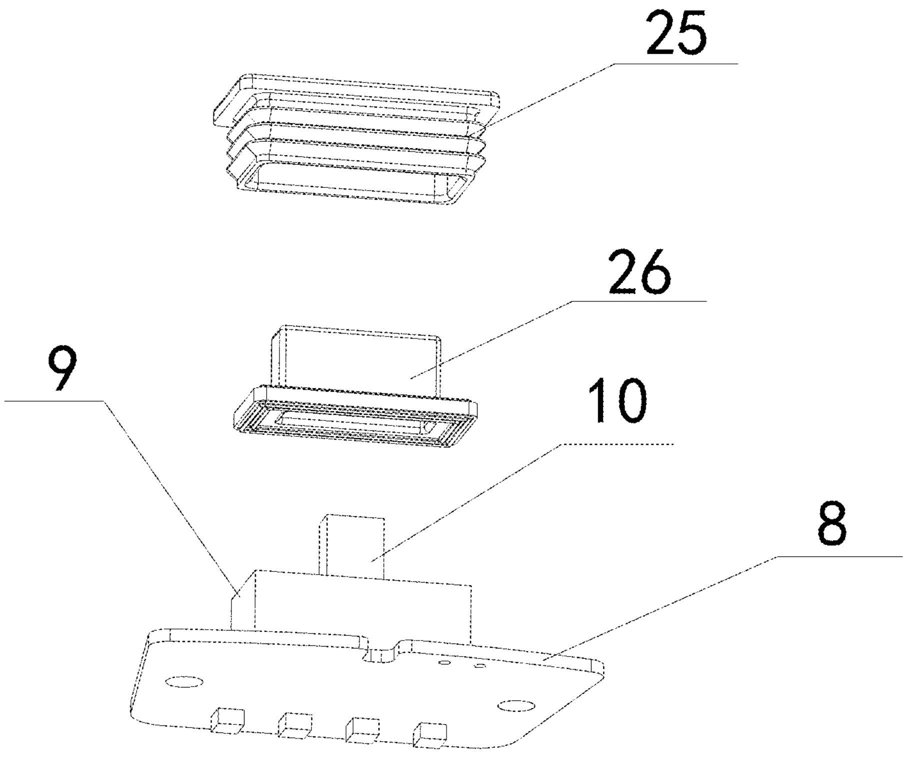
FIG. 6 is an exploded view of the angle controller of FIG. 4.

As shown in FIGS. 4 to 6, the lamp holder 1 is provided with a fixing groove 27, and the angle controller 7 is fixed in the fixing groove 27. The angle controller 7 includes a switch base 8, an electronic switch 9, and a handle 10. The switch base 8 is fixed in the fixing groove 27. The electronic switch 9 is fixedly mounted on the switch base 8. The electronic switch 9 is electrically connected to the driving power supply 4 and the LED lamp panel 2. The electronic switch 9 has a plurality of states. The handle 10 is connected to the electronic switch 9 and is configured to be toggled to change the state of the electronic switch 9, that is, to change a state of the angle controller 7. An end of the handle 10 away from the electronic switch 9 may extend out of the bottom of the lamp holder 1, so that the handle 10 can be conveniently toggled by a user. The electronic switch 9 is configured to control whether the first lamp bead 11, the second lamp bead 12, the third lamp bead 13, and the fourth lamp bead 14 emit light according to different states of the electronic switch 9.

The angle controller 7 further includes a rubber sleeve 26 and a rubber plug 25. The rubber sleeve 26 is sleeved on the handle 10, and the rubber plug 25 is adapted to an opening of the fixing groove 27. When the handle 10 is not used, the rubber plug 25 can be accommodated in the opening of the fixing groove 27, so that the angle controller 7 can achieve a good waterproof and dustproof effect.

As shown in FIGS. 9 to 12, the light-transmitting plate 3 is provided with a lens structure. The light-transmitting plate 3 includes a lens frame 18 and a plurality of lenses 19 provided on the lens frame 18. The plurality of lenses 19 are arranged corresponding to the light-emitting elements 6 and protrude in a direction away from the light-emitting elements 6. The lens frame 18 is provided with a plurality of through holes 20 corresponding to the plurality of lenses 19.

The plurality of lenses 19 are uniformly arranged in a plurality of sectors on the lens frame 18 around an axis of the lens frame 18 In each sector, a plurality of rows of the lenses 19 are provided. In each row of lenses 19, a plurality of lenses 19 are arranged in an arc. In the same sector, there is a fourth gap 21 between two adjacent rows of lenses 19. There is a fifth gap 22 between two lenses 19 between two adjacent sectors. A circle formed by the lenses 19 closest to the axis of the lens frame 18 has a minimum radius, and as the lenses are located away from the axis of the lens frame 18, a radius of a circle formed by the corresponding lenses increases gradually.

The lens 19 includes a first lens portion 29, the second lens portion 30, the third lens portion 31, and the fourth lens portion 32 that protrude from a side thereof away from the light-emitting elements 6 and are provided corresponding to the first lamp bead 11, the second lamp bead 12, the third lamp bead 13, and the fourth lamp bead 14, respectively. At least two of the first lens portion 29, the second lens portion 30, the third lens portion 31, and the fourth lens portion 32 have different focal lengths. The second lens portion 30 and the fourth lens portion 32 are respectively provided with a groove 23 on a side away from the second lamp bead 12 and the fourth lamp bead 14. Certainly, the grooves 23 can be provided on the first lens portion 29 and the third lens portion 31 on a side away from the first lamp bead 11 and the third lamp bead 13. The arrangement of the grooves 23 can increase the light emission angles of the lamp bead 11, the second lamp bead 12, the third lamp bead 13, and the fourth lamp bead 14.

Figure 13:
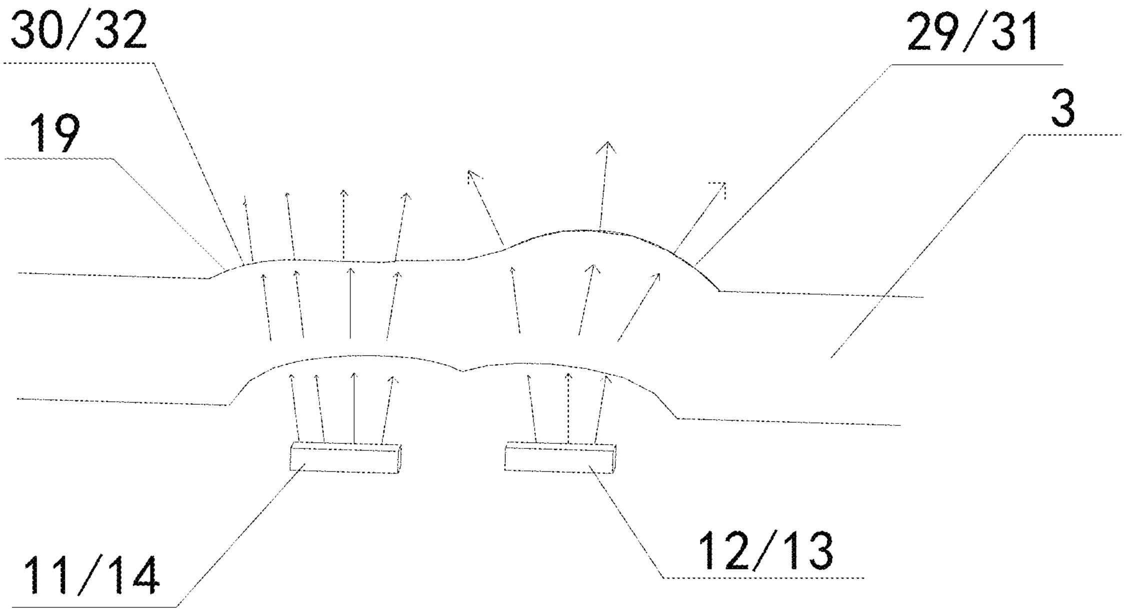
FIG. 13 is a schematic diagram of a lens according to an embodiment of the present disclosure.

As shown in FIG. 13, the first lens portion 29, the second lens portion 30, the third lens portion 31, and the fourth lens portion 32 of the lens 19 are server as a plurality of convex lenses. The light emitted from the light-emitting element 6 passes through a light-incident surface of the lens 19, and is condensed by the plurality of convex lenses and then is directed to the outside. Since the focal length of the convex lens will affect a light output angle of the light passing through the convex lens, the above arrangement can enable the LED lamp to have different light output angles. In an embodiment, the first lens portion 29 and the third lens portion 31 have the same focal length, the second lens portion 30 and the fourth lens portion 32 have the same focal length, and the focal length of the first lens portion 29 or the third lens portion 31 is different from the focal length of the second lens portion 30 or the fourth lens portion 32. The entire surfaces of the first lens portion 29 and the third lens portion 31 away from the light emitting element 6 are convex surfaces, and the first lens portion 29 and the third lens portion 31 refracts light at an angle of 60°, that is, the light output angle of the light passing through the first lens portion 29 or the third lens portion 31 is 60°. The grooves 23 are provided on the second lens portion 30 and the fourth lens portion 32, and second lens portion 30 and the fourth lens portion 32 refracts light at an angle of 110°. In this way, when the light emitted from the second lamp bead 12 and the fourth lamp bead 14 passes through the light-entering surface of the lens 19, and then is condensed by the second lens portion 30 and the fourth lens portion 32 and then directed to the outside at the light output angle of 60°. Since the grooves 23 are provided, when the light emitted from the first lamp bead 11 and the third lamp bead 13 passes through the light incident surface of the lens 19, the light is condensed by the second lens portion 30 and the fourth lens portion 32 and then directed to the outside at the light output angle of 110°. That is, the focal length of the second lens portion 30 and the fourth lens portion 32 is greater than that of the first lens portion 29 and the third lens portion 31, and the light output angle of the light passing through the second lens portion 30 and the fourth lens portion 32 is greater than that of the first lens portion 29 and the third lens portion 31.

When the light angle of the LED lamp needs to be adjusted, the handle 10 is toggled to switch the state of the angle controller 7, so that the electronic switch 9 is in the corresponding state. The relationship between the different states of the electronic switch 9 and the light angles of the LED is as follows:

When the electronic switch 9 is in a first state, the first lamp bead 11 is turned on and emits light. At this time, the light angle of the LED lamp is 60° and the color temperature value of the light emitted from the LED lamp is 3000 K.

When the electronic switch 9 is in a second state, the first lamp bead 11 and the third lamp bead 13 are turned on and emit light. At this time, the light angle of the LED lamp is 60° and the color temperature value of the light emitted from the LED lamp is 4000 K.

When the electronic switch 9 is in a third state, the third lamp bead 13 is turned on and emits light. At this time, the light angle of the LED lamp is 60° and the color temperature value of the light emitted from the LED lamp is 5000 K.

When the electronic switch 9 is in a fourth state, the first lamp bead 11 and the second lamp bead 12 are turned on and emit light. At this time, the light angle of the LED lamp is 90° and the color temperature value of the light emitted from the LED lamp is 3000 K.

When the electronic switch 9 is in a fifth state, the first lamp bead 11, the second lamp bead 12, the third lamp bead 13, and the fourth lamp bead 14 are turned on and emit light. At this time, the light angle of the LED lamp is 90° and the color temperature value of the light emitted from the LED lamp is 4000 K.

When the electronic switch 9 is in a sixth state the third lamp bead 13 and the fourth lamp bead 14 are turned on and emit light. At this time, the light angle of the LED lamp is 90° and the color temperature value of the light emitted from the LED lamp is 5000 K.

When the electronic switch 9 is in a seventh state, the second lamp bead 12 is turned on and emits light. At this time, the light angle of the LED lamp is 110° and the color temperature value of the light emitted from the LED lamp is 3000 K.

When the electronic switch 9 is in an eighth state, the second lamp bead 12 and the fourth lamp bead 14 are turned on and emit light. At this time, the light angle of the LED lamp is 110° and the color temperature value of the light emitted from the LED lamp is 4000 K.

When the electronic switch 9 is in a ninth state, the fourth lamp bead 14 is turned on and emits light. At this time, the light angle of the LED lamp is 110° and the color temperature value of the light emitted from the LED lamp is 5000 K.

Figure 3:
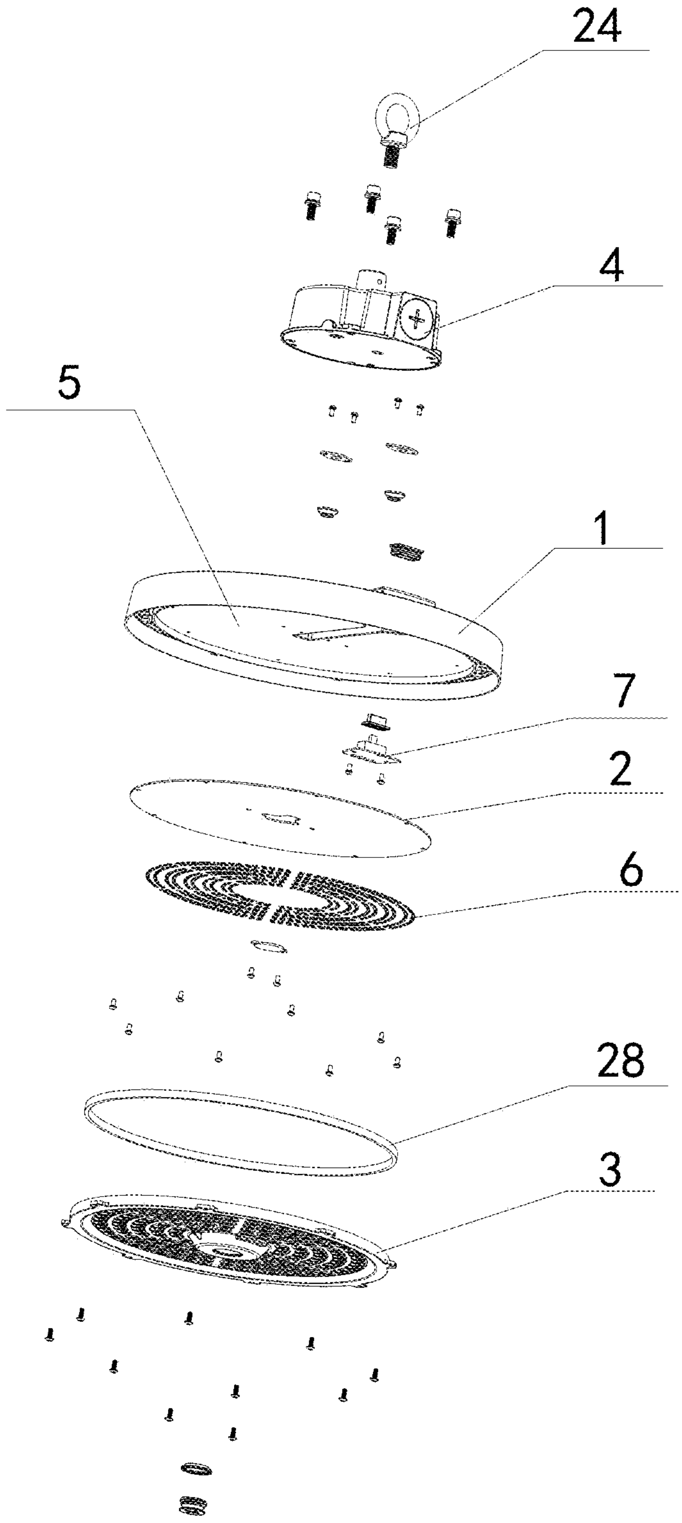
FIG. 3 is an exploded view of the LED lamp of FIG. 1.

As shown in FIG. 3, the LED lamp further includes a sealing ring 28 provided between the light-transmitting plate 3 and the LED lamp panel 2. A good waterproof effect can be achieved.

As shown in FIGS. 1 to 4, the LED lamp further includes a hanging ring 24 mounted to the driving power supply 4, and the hanging ring 24 is configured to be mounted to a ceiling, so as to mount the LED lamp.

According to the above-mentioned LED lamp, the light angle, color temperature and power of the LED lamp can be adjusted only by operating the angle controller 7 without replacing the lens plate, thereby saving the cost of replacing the lens plate 3 and being safer and more reliable.

The above-mentioned embodiments do not constitute a limitation on the protection scope of the technical solution. Any modifications, equivalent replacements and improvements made within the spirit and principles of the above-mentioned embodiments shall be included within the protection scope of this technical solution.

The foregoing descriptions are merely specific embodiments of the present disclosure, but are not intended to limit the protection scope of the present disclosure. Any variation or replacement readily figured out by a person skilled in the art within the technical scope disclosed in the present disclosure shall all fall within the protection scope of the present disclosure.

What is claimed is:

1. An LED lamp, comprising:

a lamp holder provided with a mounting groove;

an LED lamp panel mounted in the mounting groove and comprising a plurality of groups of light-emitting elements uniformly arranged in a plurality of sectors;

a driving power supply mounted to the lamp holder and configured to supply power to the LED lamp panel;

a light-transmitting plate fixed to the lamp holder and covering the LED lamp panel; and an angle controller electrically connected between the LED lamp panel and the driving power supply, the angle controller provided on the lamp holder to control the light-emitting elements corresponding to different positions on the light-transmitting plate to emit light;

wherein the light-transmitting plate is provided with a lens structure, the light-transmitting plate comprises a lens frame and a plurality of lenses provided on the lens frame, the plurality of lenses are arranged corresponding to the light-emitting elements and protrude in a direction away from the light-emitting elements, and the lens frame is provided with a plurality of through holes corresponding to the plurality of lenses;

the plurality of lenses are uniformly arranged in a plurality of sectors on the lens frame around an axis of the lens frame, in each sector, a plurality of rows of the lenses are provided; in each row of lenses, a plurality of lenses are arranged in an arc; in the same sector, there is a fourth gap between two adjacent rows of lenses, there is a fifth gap between two lenses between two adjacent sectors, a circle formed by the lenses closest to the axis of the lens frame has a minimum radius, and as the lenses are located away from the axis of the lens frame, a radius of a circle formed by the corresponding lenses increases gradually;

each group of light-emitting elements comprises a first lamp bead, a second lamp bead, a third lamp bead and a fourth lamp bead that are arranged in a substantially rectangular shape, the lens is provided with grooves corresponding to the second lamp bead and the fourth lamp bead, respectively, or the lens is provided with grooves corresponding to the first lamp bead and the third lamp bead.

2. The LED lamp according to claim 1, wherein there is a first gap between two adjacent sectors of the light-emitting elements, in each group of light emitting elements, there is a second gap between two adjacent rows of the light-emitting elements, and there is a third gap between two adjacent light-emitting elements in the same row of light-emitting elements.

3. The LED lamp according to claim 1, wherein each group of light-emitting elements comprises a first lamp bead, a second lamp bead, a third lamp bead, and a fourth lamp bead that are arranged in a substantially rectangular shape, a spacing between the first lamp bead and the second lamp bead and a spacing between the third lamp bead and the fourth lamp bead are 8 mm to 11 mm, respectively, and a spacing between the first lamp bead and the fourth lamp bead and a spacing between the second lamp bead and the third lamp bead are 7 mm to 9 mm, respectively.

4. The LED lamp according to claim 3, wherein the angle controller comprises a switch base, an electronic switch, and a handle, the switch base is fixed in the lamp holder, the electronic switch is fixedly mounted on the switch base and is electrically connected to the driving power supply and the LED lamp panel, the electronic switch has a plurality of states, the handle is connected to the electronic switch and is configured to be toggled to change the state of the electronic switch, and the electronic switch is configured to control whether the first lamp bead, the second lamp bead, the third lamp bead, and the fourth lamp bead to be turned on and emit light according to different states of the electronic switch.

5. The LED lamp according to claim 4, wherein the first lamp bead is turned on and emits light when the electronic switch is in a first state, the first lamp bead and the third lamp bead are turned on and emit light when the electronic switch is in a second state, the third lamp bead is turned on and emits light when the electronic switch is in a third state, the first lamp bead and the second lamp bead are turned on and emit light when the electronic switch is in a fourth state, the first lamp bead, the second lamp bead, the third lamp bead, and the fourth lamp bead are turned on and emit light when the electronic switch is in a fifth state, the third lamp bead and the fourth lamp bead are turned on and emit light when the electronic switch is in a sixth state, the second lamp bead is turned on and emits light when the electronic switch is in a seventh state, the second lamp bead and the fourth lamp bead are turned on and emit light when the electronic switch is in an eighth state, and the fourth lamp bead is turned on and emits light when the electronic switch is in a ninth state.

6. The LED lamp according to claim 1, further comprising a sealing ring provided between the light-transmitting plate and the LED lamp panel.

7. The LED lamp according to claim 6, further comprising a hanging ring mounted to the driving power supply, wherein the hanging ring is configured to be mounted to a ceiling.

* * * * *